May 26, 1925.  
L. H. VERVOORT  
LATHE CENTER  
Original Filed July 22, 1920  
1,539,337
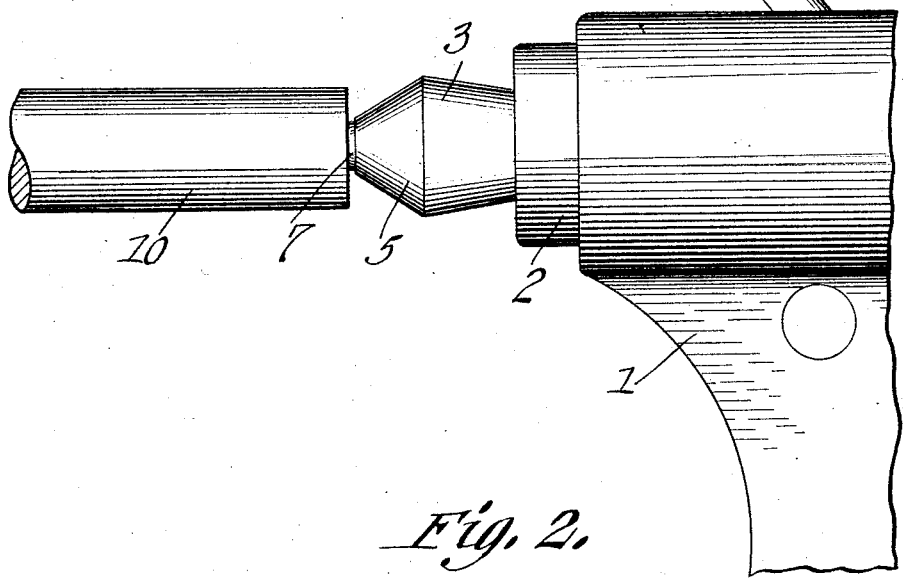
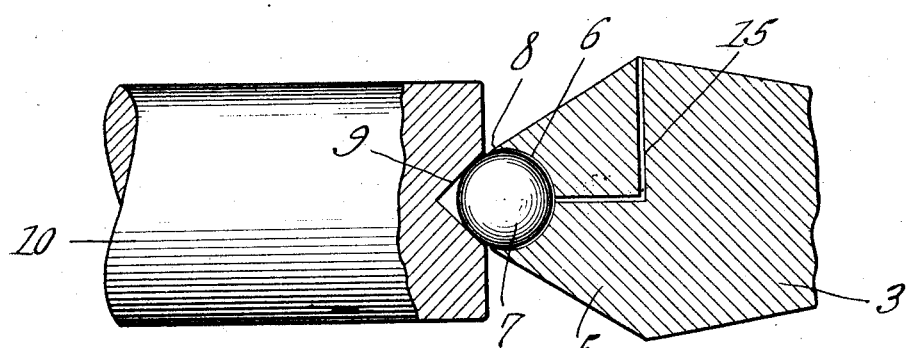
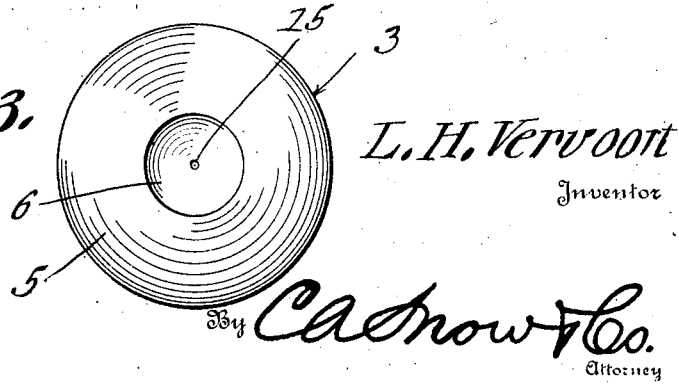
L. H. Vervoort
Inventor
By C. A. Snow & Co.
Attorney Patented May 26, 1925.

1,539,337

UNITED STATES PATENT OFFICE.

LAMBERT H. VERVOORT, OF CLEVELAND, OHIO.

LATHE CENTER.

Application filed July 22, 1920, Serial No. 398,096. Renewed July 2, 1923.

*To all whom it may concern:*

Be it known that I, LAMBERT H. VERVOORT, a citizen of the United States, and a resident of Cleveland, in the county of Cuyahoga and State of Ohio, have invented new and useful Improvements in Lathe Centers, of which the following is a specification.

The present invention relates to lathe centers, and has for an object to provide such a device which may be used in the manner of an ordinary lathe center, and wherein no modifications either in the lathe structure or in the piece of work are required.

By way of explanation, it may be stated that the center of a tail stock in a lathe frequently sticks to or catches in the work, due to heating or otherwise, the result being that the extremity of the center is twisted off.

The foregoing being understood, it is the object of this invention to provide a freely rotatable work-engaging element for the tail stock of a lathe, means being provided whereby said element may be lubricated.

It is within the province of the invention to improve generally and to enhance the utility of devices of the sort hereinafter described and claimed and illustrated in the accompanying drawings, wherein:—

Figure 1 shows in side elevation, a tail stock equipped with the device forming the subject matter of this application; Figure 2 is a detail enlarged from Figure 1, parts being broken away; and Figure 3 is an end elevation of the center.

The numeral 1 marks the tail stock of a lathe in which is located a bushing 2 carrying a center 3 adapted to be manipulated and held by any common means 4, the center being bluntly pointed, as indicated at 5, and being provided in its end with a concaved seat 6, a ball 7 being freely rotatable in the seat. The constituent material of the center may be extended, as indicated at 8, far enough on the ball 7 to hold the ball rotatably in the seat 6. A duct 15 is formed in the center 3 and leads to the center 6, to the end that a lubricant for the ball may be introduced into the seat. Clearly, when the ball 7 is received in the center mark 9 of the work 10, the work will be supported anti-frictionally, and the end of the lathe center cannot be broken or twisted off.

I claim:—

1. A lathe center having the usual tapering end and provided at its apex with a spherical recess forming a ball seat, and a ball fitting in said seat and projecting therefrom sufficiently only to substantially complete the tapering end of the center and to provide a universal supporting point adapted to engage in the center opening of a piece of work.

2. A lathe center having a spherical recess in its pointed end, and a ball seated in the recess, the metal of the center at the marginal edge of the recess being extended beyond the center of recess and embracing the ball beyond the center thereof to retain the ball in the recess, said ball projecting from the recess at the apex of the center sufficiently to engage the work.

3. A lathe center provided with a spherical recess open beyond the center of the recess, and a ball positioned in said recess having a portion extending therefrom for engaging work and held therein by the peripheral edge of the center body surrounding the opening into the recess.

In testimony that I claim the foregoing as my own, I have hereto affixed my signature in the presence of two witnesses.

LAMBERT H. VERVOORT.

Witnesses:
F. L. SEARCH,
MASON B. LAWTON.